US008208957B2

(12) United States Patent
Inoue

(10) Patent No.: US 8,208,957 B2
(45) Date of Patent: Jun. 26, 2012

(54) WIRELESS COMMUNICATION METHOD AND WIRELESS COMMUNICATION APPARATUS

(75) Inventor: Hiroshi Inoue, Yokohama (JP)

(73) Assignee: Kyocera Corporation, Kyoto (JP)

( * ) Notice: Subject to any disclaimer, the term of this patent is extended or adjusted under 35 U.S.C. 154(b) by 296 days.

(21) Appl. No.: 12/443,425

(22) PCT Filed: Sep. 27, 2007

(86) PCT No.: PCT/JP2007/068862
§ 371 (c)(1),
(2), (4) Date: Jan. 20, 2010

(87) PCT Pub. No.: WO2008/047554
PCT Pub. Date: Apr. 24, 2008

(65) Prior Publication Data
US 2010/0142440 A1 Jun. 10, 2010

(30) Foreign Application Priority Data
Sep. 28, 2006 (JP) .................................. 2006-264790

(51) Int. Cl.
*H04W 4/00* (2009.01)
(52) U.S. Cl. ...................................... 455/552.1; 370/328
(58) Field of Classification Search ................ 455/127.2, 455/127.4, 77, 78, 75, 87, 88, 232.1, 73, 455/115.3, 553.1, 552.1; 370/328
See application file for complete search history.

(56) References Cited

U.S. PATENT DOCUMENTS
2005/0266904 A1 * 12/2005 Kitaji et al. ................ 455/575.7
2006/0189346 A1 * 8/2006 Turner et al. ............... 455/552.1

FOREIGN PATENT DOCUMENTS
| JP | 06013951 A | 1/1994 |
| JP | 11160407 A | 6/1999 |
| JP | 2004015162 A | 1/2004 |
| JP | 2005347791 A | 12/2005 |

OTHER PUBLICATIONS

Japanese language office action dated Mar. 1, 2011 and its English language translation for corresponding Japanese application 2006264790 cites the U.S. patent application publication and foreign patent document above.
International search report for corresponding PCT application PCT/JP2007/068862 lists the references above.
Japanese language office action dated Jun. 21, 2011 and its English language translation for corresponding Japanese application 2006264790.

* cited by examiner

*Primary Examiner* — Kamran Afshar
*Assistant Examiner* — Kenneth Corbin
(74) *Attorney, Agent, or Firm* — DLA Piper LLP (US)

(57) ABSTRACT

A wireless communication method and a wireless communication apparatus capable of efficiently improving communication throughput of a second wireless communication system while securing a capturing capability of informative information in a first wireless communication system are provided. A transmitting/receiving unit (2, 3, 6) capable of transmitting/receiving information through first and second wireless communication systems (1x and EVDO) and a receiving unit (4, 7) capable of receiving information through the first and second wireless communication systems and whose reception gain in the first wireless communication system is smaller than the transmitting/receiving unit are used to detect that a reception sensitivity of informative information notifying a reception by the transmitting/receiving unit through the first wireless communication system has exceeded a first threshold or a second threshold set in accordance with a reception gain difference between the transmitting/receiving unit and the receiving unit when information is being transmitted/received by the transmitting/receiving unit through the second wireless communication system, and to switch reception of the informative information from the transmitting/receiving unit to the receiving unit.

7 Claims, 13 Drawing Sheets

FIG. 9
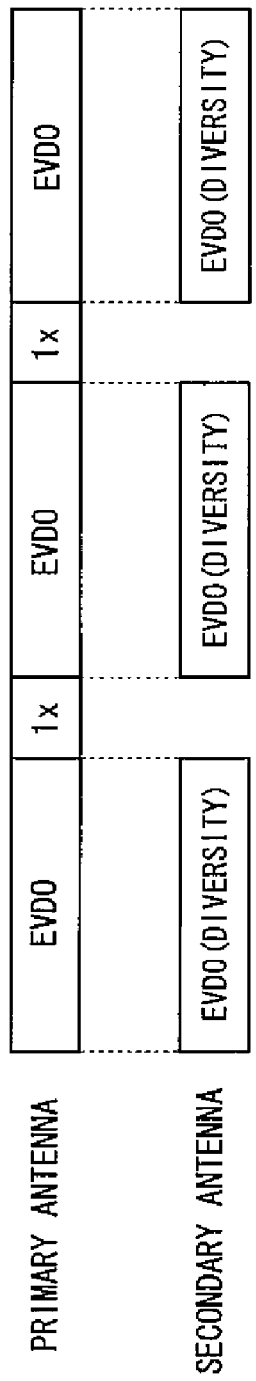
(a) HYBRID MODE
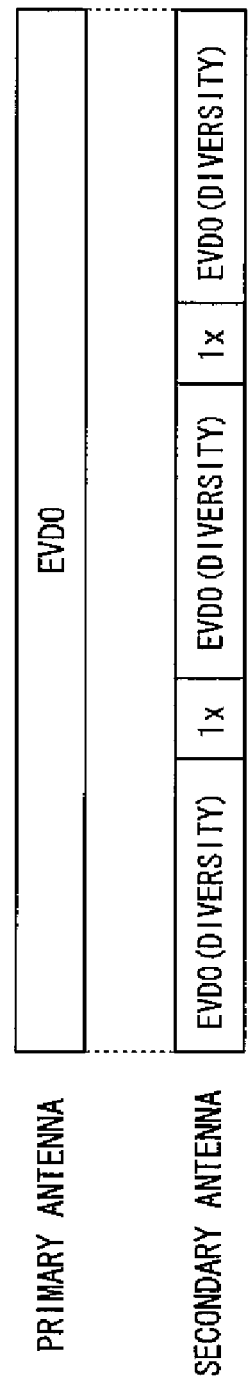
(b) SHDR MODE

| | PRIMARY ANTENNA | SECONDARY ANTENNA (dBi) |
|---|---|---|
| 800MHz BAND | −3 | −10 |
| 2GHz BAND | 0 | −3 |

(b)

| | | SECONDARY ANTENNA (dBi) | |
|---|---|---|---|
| | | 800MHz BAND | 2GHz BAND |
| PRIMARY ANTENNA | 800MHz BAND | 7 | 0 |
| | 2GHz BAND | 10 | 3 |

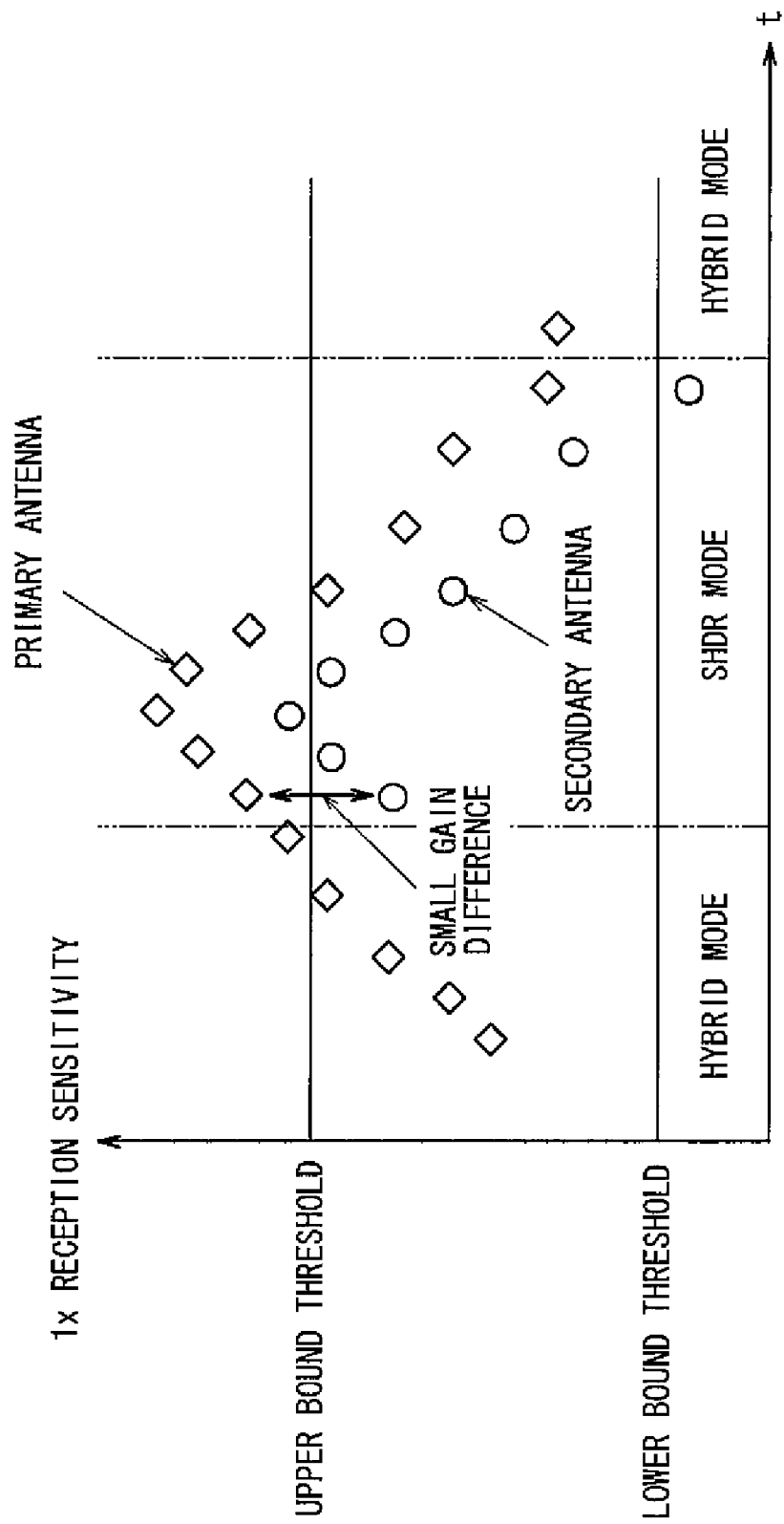

WIRELESS COMMUNICATION METHOD AND WIRELESS COMMUNICATION APPARATUS

CROSS-REFERENCE TO RELATED APPLICATIONS

The present application is based upon and claims the benefit of priority from Japanese Patent Application No. 2006-264790 (filed on Sep. 28, 2006), the entire contents of which are incorporated herein by reference.

TECHNICAL FIELD

The present invention relates to a wireless communication method and a wireless communication apparatus that implements the same.

BACKGROUND ART

In recent years, for wireless communication apparatuses such as cellular phones, there are a plurality of systems that are each in correspondence with a plurality of standards. For example, in Japan, the TDMA system and the CDMA system have gained popularity as cellular phone systems.

Normally, a wireless communication apparatus is configured so as to accommodate any one of the standards. However, given the restrictions imposed on frequency bands allocated to the respective systems due to the proliferation of terminals, recent cellular phone systems reflect a transition to multiband. In addition, in order to provide stable and sophisticated service, a transition to multiband is also performed involving handoffs between different frequency bands and communication carried out among a plurality of communication systems (for example, 1x and 1xEVDO).

As such a multiband-capable wireless communication apparatus, for example, a cellular phone terminal is known which combines the TDMA system with the CDMA system and couples a TDMA transmitting/receiving unit and a CDMA transmitting unit to a primary antenna and a CDMA receiving unit to a secondary antenna (for example, refer to Japanese Patent Laid-Open No. 2004-15162).

In addition, more recently, a multiband-capable cellular phone terminal is being considered which is equipped with a SHDR (Simultaneous Hybrid Dual Receiver) function in which transmission/reception of a system is performed by a primary antenna while reception of another system is performed by a secondary antenna in order to improve communication throughput by the primary antenna.

FIG. 8 is a functional block diagram showing a schematic configuration of substantial parts of a cellular phone terminal equipped with such a SHDR function.

The cellular phone terminal is provided with: a 1x communication system which uses a 800 MHz band-cdma 2000 system (hereinafter abbreviated as 800 MHz band when appropriate) and a 2 GHz band-cdma 2000 system (hereinafter abbreviated as 2 GHz band when appropriate); a 1xEVDO (hereinafter simply abbreviated as EVDO when appropriate) communication system; and an 1575.42 MHz (hereinafter abbreviated as 1.5 GHz band when appropriate) GAS frequency receiving capability, and includes a transmitting unit (Tx) 101 connected to a baseband unit 100 having a modulating circuit and a demodulating circuit, a primary receiving unit (primary Rx) 102, and a secondary receiving unit (secondary Rx) 103.

The transmitting unit 101 and the primary receiving unit 102 are connected to a primary antenna 105 via a duplexer 104, and are capable of transmission/reception at the 800 MHz band and the 2 GHz band. In addition, the secondary receiving unit 103 is connected to a secondary antenna 106 and is independently capable of reception at the 800 MHz band, the 2 GHz band and the 1.5 GHz band.

The cellular phone terminal adopts a diversity system for EVDO communication and is arranged to regularly receive, during such EVDO communication, informative information (paging) notifying 1x communication from a base station to monitor incoming call, and is provided with a hybrid mode and an SHDR mode that uses the SHDR function as operating modes.

In the hybrid mode, as shown in FIG. 9(*a*), during EVDO communication, the primary antenna 105 side is regularly switched to 1x communication to receive paging. Moreover, in the hybrid mode, there are cases where the secondary antenna 106 side is synchronized with the primary antenna 105 side to perform diversity reception of 1x communication paging. Meanwhile, in the SHDR mode, as shown in FIG. 9(*b*), incoming call is monitored by having the primary antenna 105 side continue EVDO communication and regularly switching the secondary antenna 106 side to 1x communication to receive paging.

In this case, in the SHDR mode, as shown in FIG. 9(*b*), since EVDO communication is continued on the primary antenna 105 side without switching to 1x communication, EVDO communication throughput can be improved compared to the hybrid mode.

However, since the secondary antenna 106 receives three bands, namely, the 800 MHz band, the 2 GHz band, and the 1.5 GHz band, antenna gains at the 800 MHz band and the 2 GHz band are generally lower compared to the primary antenna 105 which performs transmission/reception in two bands, namely, the 800 MHz band and the 2 GHz band. For example, as shown in FIG. 10(*a*), while the antenna gains of the primary antenna 105 at the 800 MHz band and the 2 GHz band are, respectively, −3 dBi and 0 dBi, the antenna gains of the secondary antenna at the 800 MHz band and the 2 GHz band 106 are, respectively, −10 dBi and −3 dBi. Therefore, the SHDR mode has a lower capturing capability of paging from a base station as compared to the hybrid mode.

In this light, conventionally, as shown in FIG. 8, an actual 1x reception sensitivity received at the primary receiving unit 102 or the secondary receiving unit 103 and inputted to the baseband unit 100 is compared at a mode switching unit 108 to an upper bound threshold and a lower bound threshold of 1x reception sensitivity stored beforehand in a threshold memory 107. Based on the comparison result, as shown in FIG. 11, the baseband unit 100, the transmitting unit 101, the primary receiving unit (primary Rx) 102 and the secondary receiving unit (secondary Rx) 103 are controlled so as to switch to the SHDR mode when the 1x reception sensitivity exceeds the upper bound threshold during the hybrid mode and switch to the hybrid mode when the 1x reception sensitivity falls to or below the lower bound threshold during the SHDR mode.

In other words, when switching modes, as described in the flowchart shown in FIG. 12, the hybrid mode is first set as a default operating mode (step S111), a judgment is made on whether a 1x paging is to be received or not or, in other words, a judgment is made on whether a 1x search is to be executed or not (step S112), and when a 1x search is to be executed, next, an operating mode of the mode switching unit 108 at that point is judged (step S113).

At this point, when the operating mode is judged to be the hybrid mode, as shown in FIG. 9(*a*), EVDO communication and 1x reception are performed on the primary antenna 105 side while EVDO communication diversity reception is performed on the secondary antenna 106 side (step S114). In this case, since a 1x paging is received by the primary antenna 105 having a high antenna gain, next, a judgment is made by the mode switching unit 108 on whether an actual 1x reception sensitivity supplied from the baseband unit 100 exceeds an upper bound threshold or not (step S115), and if not, the routine transitions to step S112. In addition, if the 1x reception sensitivity exceeds the upper bound threshold, since a 1x paging is receivable by the secondary antenna 106 whose antenna gain is low, the operating mode is switched from the hybrid mode to the SHDR mode with a high throughput (step S116), and the routine transitions to step S112.

Meanwhile, in step S113, when the operating mode is judged to be the SHDR mode, as shown in FIG. 9(b), EVDO communication is performed on the primary antenna 105 side while EVDO communication diversity reception and 1x reception are performed on the secondary antenna 106 side (step S117). In this case, since a 1x paging is received by the secondary antenna 106 having a low antenna gain, next, a judgment is made by the mode switching unit 108 on whether an actual 1x reception sensitivity supplied from the baseband unit 100 is equal to or lower than a lower bound threshold or not (step S118), and if not, the routine transitions to step S112. In addition, if the 1x reception sensitivity is equal to or lower than the lower bound threshold, since the capturing capability of 1x paging must be increased, the operating mode is switched from the SHDR mode to the hybrid mode (step S119), and the routine transitions to step S112 while arranging 1x paging to be received by the primary antenna 105 having a high antenna gain.

SUMMARY OF INVENTION

Technical Problem

However, the cellular phone terminal shown in FIG. 8 fixedly sets one upper bound threshold of the sensitivity of 1x reception of the primary antenna 105 and the primary receiving unit 102 for switching the EVDO operating mode from the hybrid mode to the SHDR mode. In the hybrid mode, the 1x reception sensitivity is unknown because 1x is not received by the secondary receiving unit 103. Therefore, the upper bound threshold must be set in accordance with the gain differences of the primary antenna 105 and the secondary antenna 106, whichever is greater.

In other words, when the primary antenna 105 and the secondary antenna 106 have antenna gains shown in FIG. 10(a), the gain difference between the antennas is as shown in FIG. 10(b). In this case, since 1x reception switching is to be performed within the same band, the relative gain difference in the 800 MHz band (7 dBi) is greater than the relative gain difference in the 2 GHz band (3 dBi). Therefore, in this case, the upper bound threshold in regards to switching from the hybrid mode to the SHDR mode is set in accordance with the antenna gain difference at the 800 MHz band.

As a result, when 1x reception is performed at the 2 GHz band having a small antenna gain difference, as shown in FIG. 13, a significant difference does not arise between the 1x reception sensitivities of the primary antenna 105 and the secondary antenna 106. Accordingly, even in a case where sufficient paging capturing capability can be obtained by switching to the SHDR mode before the 1x reception sensitivity of the primary antenna 105 reaches the upper bound threshold, switching to the SHDR mode does not take place until the 1x reception sensitivity of the primary antenna 105 exceeds an upper bound threshold set in accordance with the antenna gain difference at the 800 MHz band. As a result, throughput cannot be improved in an efficient manner.

Moreover, the antenna characteristics of the primary antenna 105 and the secondary antenna 106 vary according to how the cellular phone terminal is held by a user or to ambient environment and, accordingly, the gain difference between both antennas also varies. Therefore, when an upper bound threshold for switching from the hybrid mode to the SHDR mode is fixedly set as described above, since a gain depression in the primary antenna 105 prevents 1x reception sensitivity from exceeding the upper bound threshold even when a sufficient paging capturing capability is obtained despite switching to the SHDR mode, switching to the SHDR mode is not performed and, again, throughput cannot be improved in an efficient manner.

Such a problem is not limited to 1x and EVDO under the cdma 2000 system, and also occurs when similarly switching operating modes in a wireless communication apparatus having a transmitting/receiving unit capable of transmitting/receiving information through two different wireless communication systems and a receiving unit capable of receiving information through the two different wireless communication systems.

Therefore, an object of the present invention made in consideration of the circumstances described above is to provide a wireless communication method capable of efficiently improving communication throughput in a second wireless communication system while securing an informative information capturing capability in a first wireless communication system, and a wireless communication apparatus that implements the wireless communication method.

Solution to Problem

An invention of a wireless communication method according to a first aspect for achieving the above object uses: a transmitting/receiving unit capable of transmitting/receiving information through a first wireless communication system and a second wireless communication system; and a receiving unit capable of receiving information through the first wireless communication system and the second wireless communication system and whose reception gain in the first wireless communication system is smaller than the transmitting/receiving unit to detect that a reception sensitivity of informative information notifying an incoming call by the transmitting/receiving unit through the first wireless communication system has exceeded a first threshold or a second threshold set in accordance with a reception gain difference between the transmitting/receiving unit and the receiving unit when information is being transmitted/received by the transmitting/receiving unit through the second wireless communication system, and switches reception of the informative information from the transmitting/receiving unit to the receiving unit.

In addition, an invention of a wireless communication apparatus according to a second aspect for achieving the above object includes: a transmitting/receiving unit capable of transmitting/receiving information through a first wireless communication system and a second wireless communication system;

a receiving unit capable of receiving information through the first wireless communication system and the second wireless communication system and whose reception gain in the first wireless communication system is smaller than the transmitting/receiving unit;

a switching unit which detects that a reception sensitivity of informative information notifying an incoming call by the transmitting/receiving unit through the first wireless communication system has exceeded a threshold when information is being transmitted/received by the transmitting/receiving unit through the second wireless communication system, and switches reception of the informative information from the transmitting/receiving unit to the receiving unit; and a threshold setting unit that sets the threshold in accordance with a reception gain difference between the transmitting/receiving unit and the receiving unit to a first threshold when the reception gain difference is large and to a second threshold when the reception gain difference is small.

An invention according to a third aspect is the wireless communication apparatus according to the second aspect, wherein the second threshold is smaller than the first threshold.

An invention according to a fourth aspect is the wireless communication apparatus according to the second aspect, wherein the receiving unit carries out diversity reception on information through the second wireless communication system when information is being transmitted/received by the transmitting/receiving unit through the second wireless communication system, and the threshold setting unit sets the first threshold or the second threshold in accordance with a reception gain difference between the transmitting/receiving unit and the receiving unit through the second wireless communication system.

An invention according to a fifth aspect is the wireless communication apparatus according to the third aspect, wherein the receiving unit carries out diversity reception on information through the second wireless communication system when information is being transmitted/received by the transmitting/receiving unit through the second wireless communication system, and the threshold setting unit sets the first threshold or the second threshold in accordance with a reception gain difference between the transmitting/receiving unit and the receiving unit through the second wireless communication system.

Furthermore, an invention of a wireless communication apparatus according to a sixth aspect for achieving the above object includes: a transmitting/receiving unit capable of transmitting/receiving information through a first wireless communication system and a second wireless communication system;

a receiving unit capable of receiving information through the first wireless communication system and the second wireless communication system and whose reception gain in the first wireless communication system is smaller than the transmitting/receiving unit;

a switching unit which detects that a reception sensitivity of informative information notifying an incoming call by the transmitting/receiving unit through the first wireless communication system has exceeded a threshold when information is being transmitted/received by the transmitting/receiving unit through the second wireless communication system, and switches reception of the informative information from the transmitting/receiving unit to the receiving unit; and a threshold setting unit that sets the threshold to a first threshold when the frequency used by the first wireless communication system and received by the transmitting/receiving unit is at a first frequency band and to a second threshold when the frequency is at a second frequency band.

An invention according to a seventh aspect is the wireless communication apparatus according to the sixth aspect, wherein the second threshold is smaller than the first threshold.

Advantageous Effects on Invention

According to the present invention, since the reception of informative information is switched from a transmitting/receiving unit to a receiving unit when a reception sensitivity of informative information notifying an incoming call by the transmitting/receiving unit through a first wireless communication system exceeds a first threshold or a second threshold set in accordance with a reception gain difference between the transmitting/receiving unit and the receiving unit when information is being transmitted/received by the transmitting/receiving unit through a second wireless communication system, communication throughput of the second wireless communication system can be improved efficiently while securing a capturing capability of informative information by the first wireless communication system.

BRIEF DESCRIPTION OF DRAWINGS

FIG. 9 is a diagram for describing a hybrid mode and a SHDR mode in EVDO communication;

FIG. 10 is a diagram showing gains of a primary antenna and a secondary antenna shown in FIG. 8 and a gain difference thereof;

FIG. 13 is a diagram for describing an inconvenience in the conventional cellular phone terminal shown in FIG. 8.

REFERENCE SIGNS LIST

Figure 1:
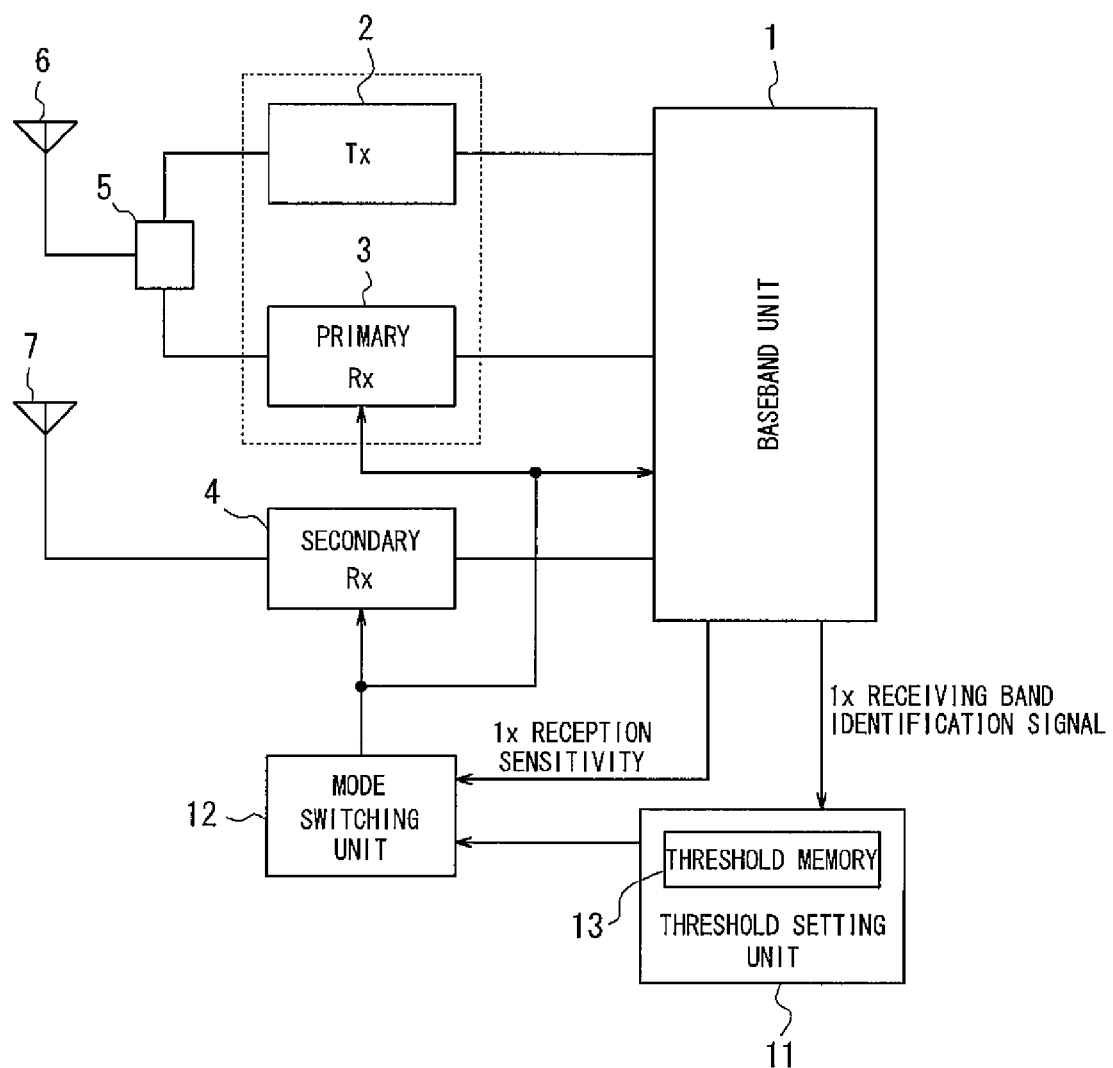
FIG. 1 is a block diagram showing a schematic configuration of a cellular phone terminal according to a first embodiment of the present invention.

1 Baseband unit
2 Transmitting unit
3 Primary receiving unit
4 Secondary receiving unit
5 Duplexer
6 Primary antenna
7 Secondary antenna
11 Threshold setting unit
12 Mode switching unit
13 Threshold memory
15 Gain difference measuring unit
17 Threshold calculating unit

DESCRIPTION OF EMBODIMENTS

Hereinafter, embodiments of the present invention will be described with reference to the drawings.

First Embodiment

Figure 8:
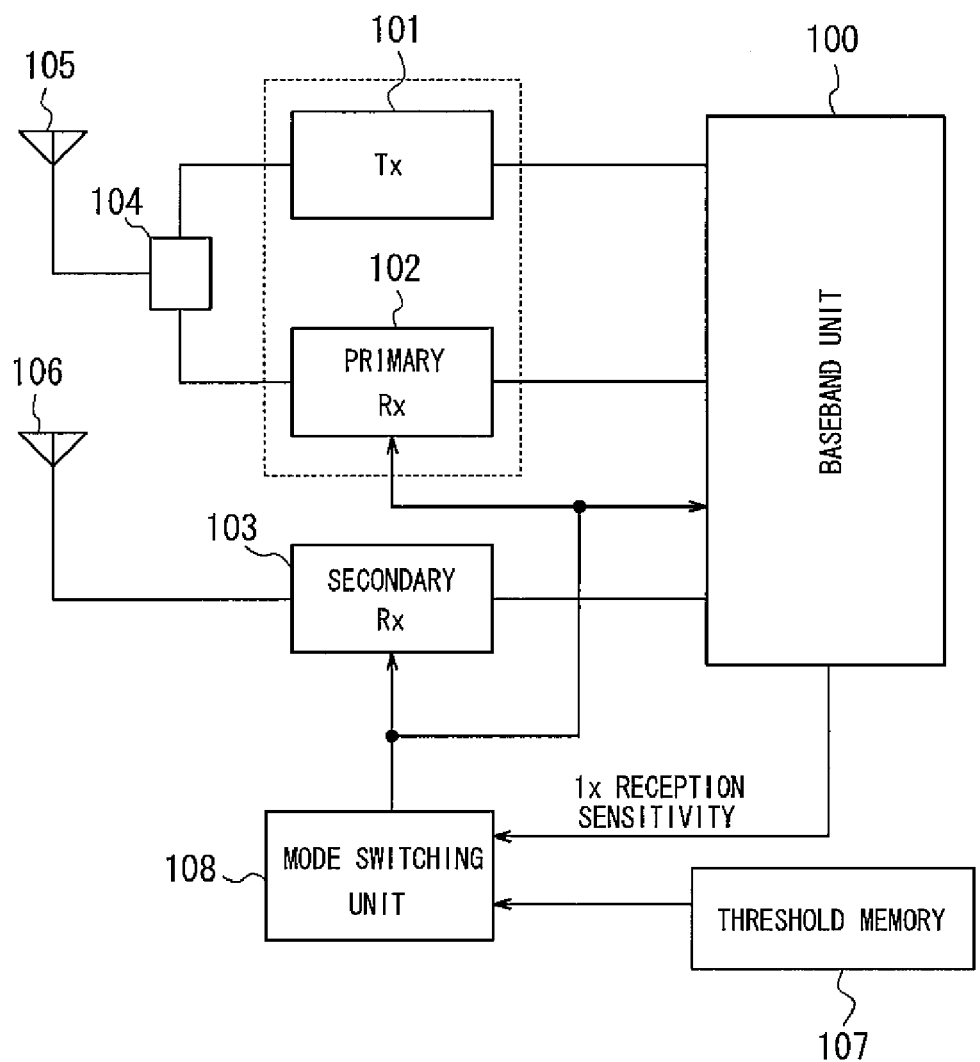
FIG. 8 is a functional block diagram showing a schematic configuration of a conventional cellular phone terminal equipped with a SHDR function.
Figure 11:
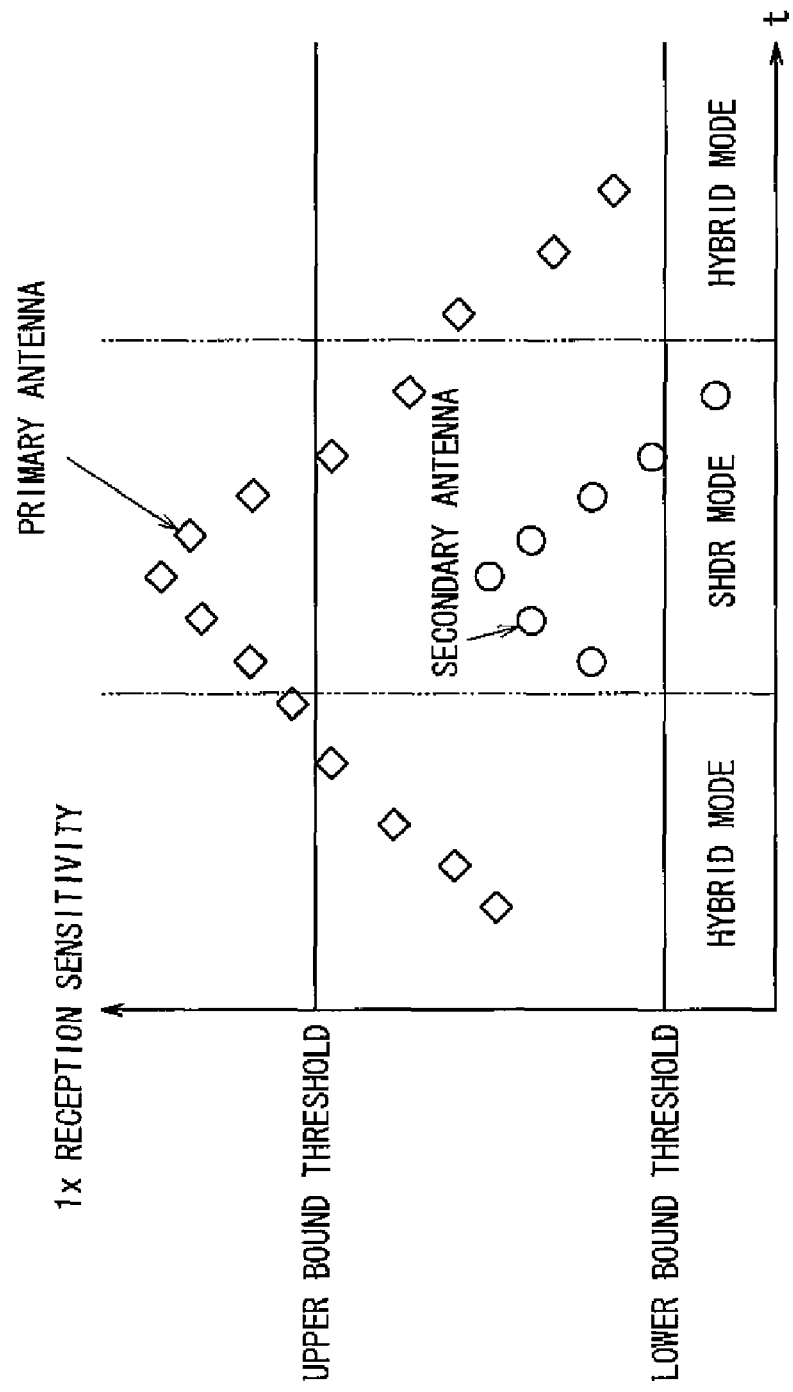
FIG. 11 is a diagram for describing mode switching of EVDO communication in the conventional cellular phone terminal shown in FIG. 8.
Figure 12:
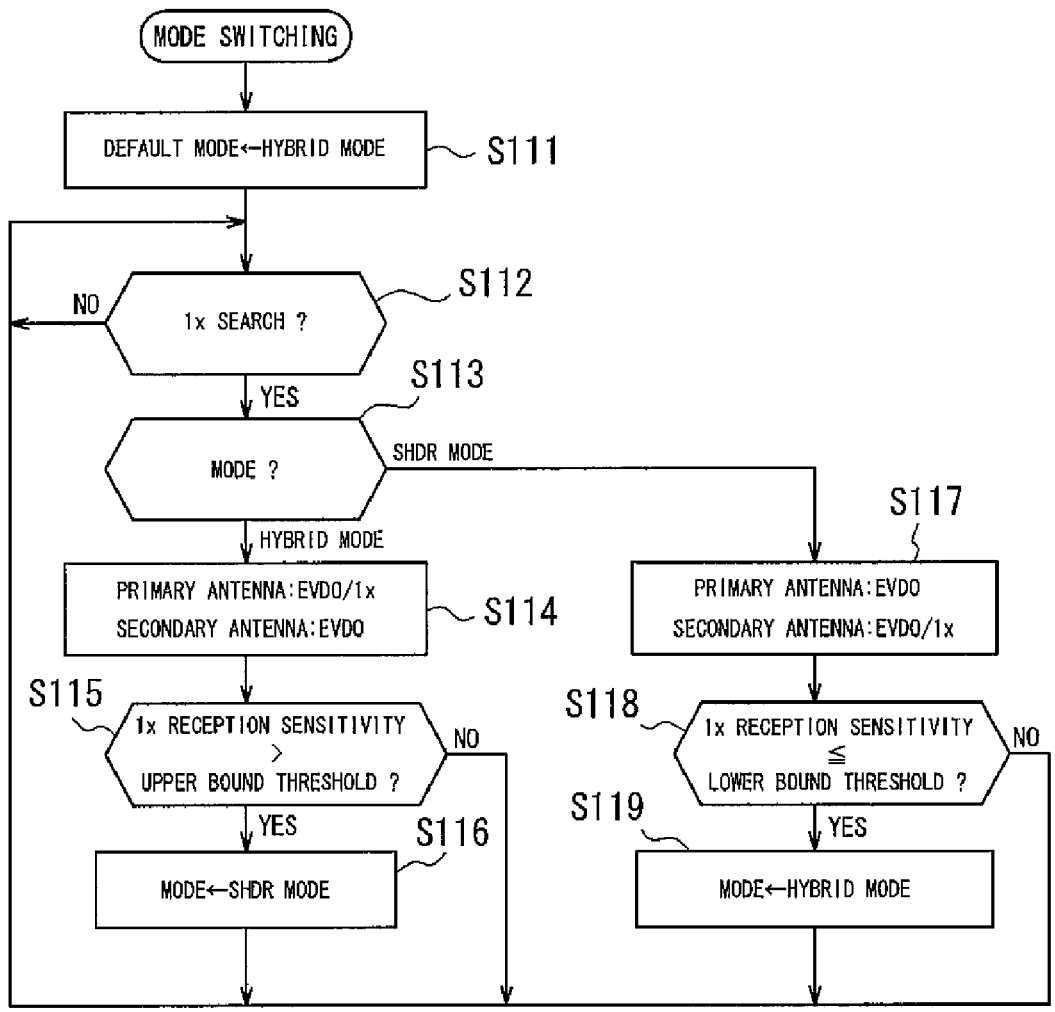
FIG. 12 is a flowchart describing a mode switching operation of EVDO communication in the conventional cellular phone terminal shown in FIG. 8.

FIG. 1 is a functional block diagram showing a schematic configuration of a cellular phone terminal as a wireless communication apparatus according to a first embodiment of the present invention. Similar to FIG. 8, the cellular phone terminal according to the present embodiment includes a 1x first wireless communication system at the 800 MHz band and the 2 GHz band and a 1xEVDO second wireless communication system, and is also provided with a 1.5 GHz band GPS frequency receiving function.

In FIG. 1, a transmitting unit (Tx) 2, a primary receiving unit (primary Rx) 3, and a secondary receiving unit (secondary Rx) 4 are connected to a baseband unit 1 having a modulating circuit and a demodulating circuit. The transmitting unit 2 and the primary receiving unit 3 are connected to a primary antenna 6 via a duplexer 5 and are capable of transmission/reception at the 800 MHz band and the 2 GHz band. In addition, the secondary receiving unit 4 is connected to a secondary antenna 7 and is capable of reception at the 800 MHz band, the 2 GHz band and the 1.5 GHz band independently of the primary receiving unit 3. In this case, a transmitting/receiving unit is configured by including the transmitting unit 2, the primary receiving unit 3, the duplexer 5 and the primary antenna 6. In addition, a receiving unit is configured by including the secondary receiving unit 4 and the secondary antenna 7.

The primary antenna 6 and the secondary antenna 7 have antenna gains such as those shown in FIG. 10(a). Respective antenna gains at the 800 MHz and 2 GHz bands are higher for the primary antenna 6 than for the secondary antenna 7. As a result, receiving gains of 1x and EVDO of the receiving unit including the secondary antenna 7 are smaller than the transmitting/receiving unit including the primary antenna 6.

Similar to FIG. 9, the cellular phone terminal adopts a diversity system for EVDO communication and is arranged to switch operating modes between a hybrid mode and an SHDR mode and to regularly receive informative information (paging) notifying incoming 1x communication from a base station in the respective modes in order to monitor incoming call.

In the present embodiment, during EVDO communication, switching from the hybrid mode to the SHDR mode is executed based on a comparison between an upper bound threshold of 1x reception sensitivity set in accordance with gain differences of the respective 1x receiving bands at the 800 MHz band and the 2 GHz band of the transmitting/receiving unit including the primary antenna 6 and the receiving unit including the secondary antenna 7, and an actual 1x reception sensitivity. Meanwhile, switching from the SHDR mode to the hybrid mode is executed in the same manner as FIG. 13 based on a comparison between a lower bound threshold commonly set for the 1x reception bands and actual 1x reception sensitivity.

Therefore, as shown in FIG. 1, the cellular phone terminal is provided with a threshold setting unit 11 and a mode switching unit 12. The threshold setting unit 11 is provided with a threshold memory 13 in which are stored: a first upper bound threshold set in accordance with a gain difference between the transmitting/receiving unit including the primary antenna 6 and the receiving unit including the secondary antenna 7 at the 800 MHz band of the terminal; a second upper bound threshold set in accordance with a gain difference between the transmitting/receiving unit including the primary antenna 6 and the receiving unit including the secondary antenna 7 at the 2 GHz band; and a lower bound threshold commonly set for the 800 MHz and 2 GHz bands.

In addition, an identification signal of a current 1x receiving band is supplied to the threshold setting unit 11 from the baseband unit 1, whereby the identification signal causes the threshold setting unit 11 to read a first upper bound threshold or a second upper bound threshold corresponding to the current 1x receiving band and a common lower bound threshold from the threshold memory 13 and to supply the thresholds to the mode switching unit 12.

The mode switching unit 12 compares an actual 1x reception sensitivity received by the primary receiving unit 3 or the secondary receiving unit 4 and inputted to the baseband unit 1 with the 1x reception sensitivity supplied from the threshold memory 13. Based on the comparison result, the baseband unit 1, the transmitting unit 2 and the primary receiving unit 3 which are the transmitting/receiving unit, and the secondary receiving unit 4 that is the receiving unit are controlled so that switching to the SHDR mode is performed when the 1x reception sensitivity exceeds the first upper bound threshold or the second upper bound threshold during the hybrid mode and switching to the hybrid mode is performed when the 1x reception sensitivity drops to or below the lower bound threshold during the SHDR mode.

Figure 2:
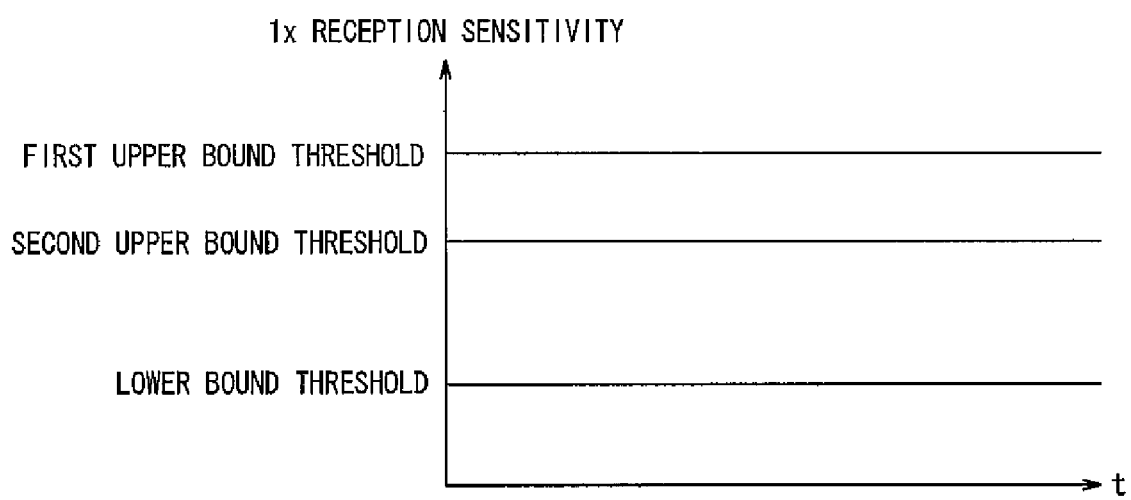
FIG. 2 is a diagram showing a relationship between a first upper bound threshold and a second upper bound threshold to be set by a threshold setting unit shown in FIG. 1.

At this point, since the primary antenna 6 and the secondary antenna 7 have antenna gains such as those shown in FIG. 10(a), the gain difference in this case is higher for the 800 MHz band (7 dBi) than for the 2 GHz band (3 dBi) as shown in FIG. 10(b). Therefore, as shown in FIG. 2, the first upper bound threshold corresponding to the 800 MHz band is set higher than the second upper bound threshold corresponding to the 2 GHz band.

Figure 3:
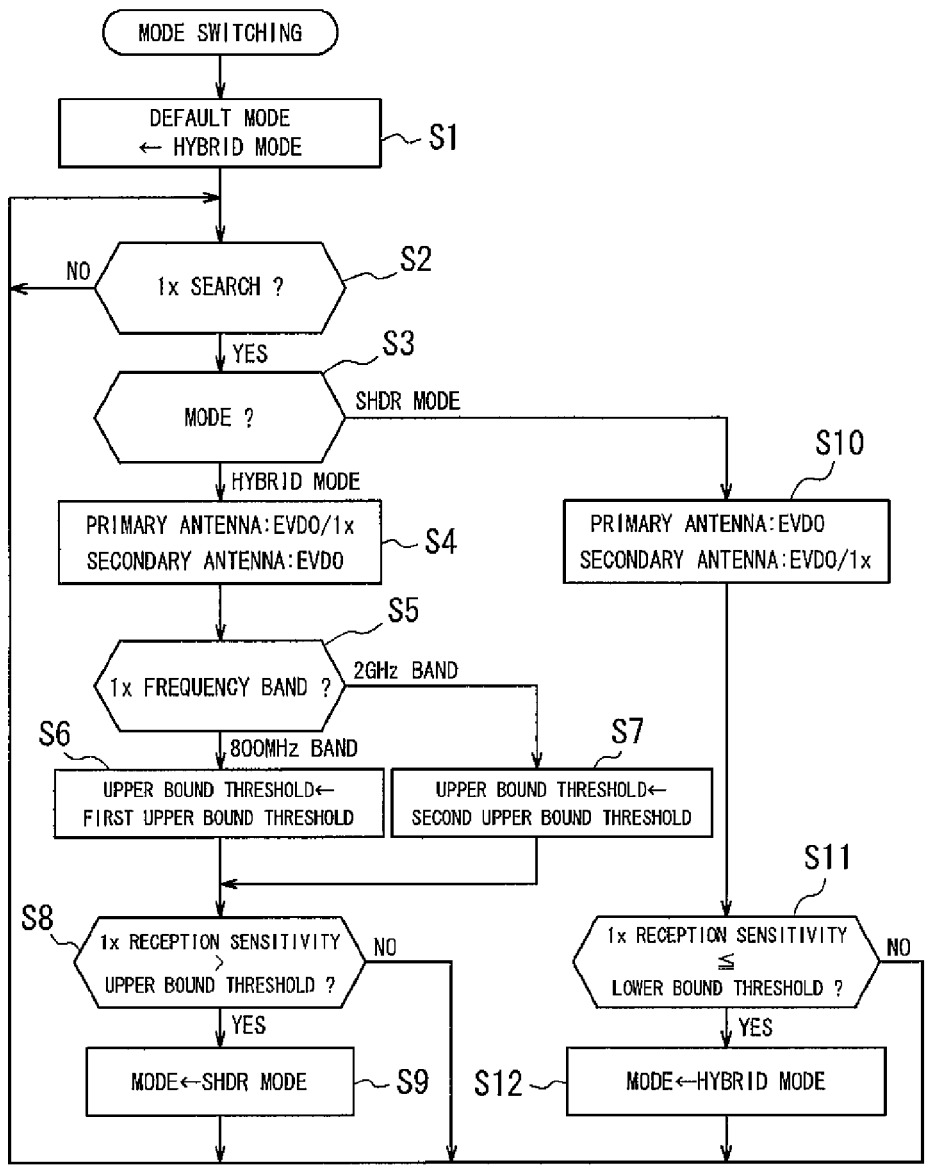
FIG. 3 is a flowchart describing a mode switching operation of EVDO communication according to the first embodiment.

Hereinafter, mode switching operations of EVDO communication in a cellular phone terminal according to the present embodiment will be described with reference to the flowchart shown in FIG. 3. The hybrid mode is first set as a default operating mode (step S1), a judgment is made on whether a 1x paging is to be received or not or, in other words, a judgment is made on whether a 1x search is to be executed or not (step S2). When a 1x search is to be executed, next, an operating mode of the mode switching unit 12 at that point is judged (step S3).

At this point, when the operating mode is judged to be the hybrid mode, as shown in FIG. 9(a), EVDO communication and 1x reception are performed on the primary antenna 6 side while EVDO communication diversity reception is performed on the secondary antenna 7 side (step S4). In this case, since a 1x paging is received by the primary antenna 6 having a high antenna gain, next, a judgment is made based on a 1x receiving band identification signal from the baseband unit 1 as to whether the 1x receiving band is the 800 MHz band or the 2 GHz band (step S5). As a result, in the case of the 800 MHz band, the first upper bound threshold is set as the upper bound threshold to be supplied from the threshold memory 13 of the threshold setting unit 11 to the mode switching unit 12 (step S6), and the case of the 2 GHz band, the second upper bound threshold is set as the upper bound threshold (step S7). Subsequently, the mode switching unit 12 judges whether the actual 1x reception sensitivity from the baseband unit 1 exceeds the upper bound threshold or not (step S8). If not, the routine transitions to step S2. If so, since a 1x paging is receivable by the secondary antenna 7 whose antenna gain is low, the operating mode is switched from the hybrid mode to the SHDR mode with a high throughput (step S9), and the routine transitions to step S2.

Meanwhile, in step S3, when the operating mode is judged to be the SHDR mode, as shown in FIG. 9(b), EVDO communication is performed on the primary antenna 6 side while EVDO communication diversity reception and 1x reception are performed on the secondary antenna 7 side (step S10). In this case, since a 1x paging is received by the secondary antenna 7 having a low antenna gain, the mode switching unit 12 judges whether or not the actual 1x reception sensitivity from the baseband unit 1 is equal to or lower than the lower bound threshold or not (step S11). As a result, if the 1x reception sensitivity is not equal to or lower than the lower bound threshold, the routine transitions to step S2. Conversely, if the 1x reception sensitivity is equal to or lower than the lower bound threshold, since the capturing capability of 1x paging must be increased, the operating mode is switched from the SHDR mode to the hybrid mode (step S12). Accordingly, the routine transitions to step S2 while arranging 1x paging to be received by the primary antenna 6 having a high antenna gain.

As shown, according to the present embodiment, in EVDO communication, since the upper bound threshold of 1x reception sensitivity when switching from the hybrid mode to the SHDR mode is set in accordance with the respective gain differences between the transmitting/receiving unit including the primary antenna 6 and the receiving unit including the secondary antenna 7 for the 800 MHz band and the 2 GHz band, the second upper bound threshold at the 2 GHz band having a small antenna gain difference is to be set lower than the first upper bound threshold at the 800 MHz band having a large antenna gain difference.

Figure 4:
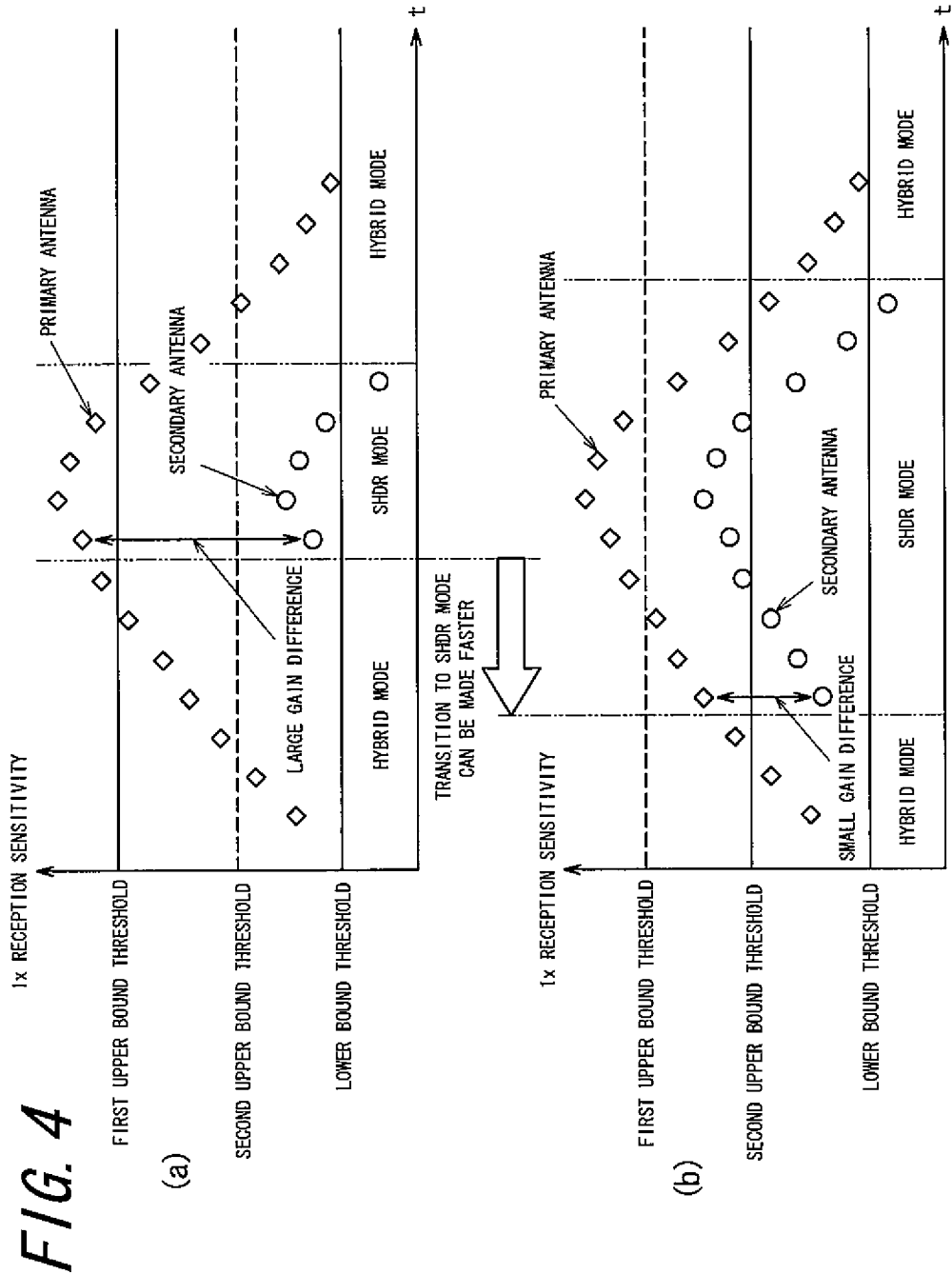
FIG. 4 is a diagram comparatively showing switching of operating modes when 1x reception is performed at the 800 MHz and 2 GHz bands according to the first embodiment.

Therefore, in the case of 1x reception performed at the 800 MHz band, as shown in FIG. 4(a), switching is performed from the hybrid mode to the SHDR mode when the 1x reception sensitivity of the primary antenna 6 and the primary receiving unit 3 exceeds the first upper bound threshold. In contrast, in the case of 1x reception performed at the 2 GHz band, as shown in FIG. 4(b), switching is performed from the hybrid mode to the SHDR mode when the 1x reception sensitivity of the secondary antenna 7 and the secondary receiving unit 4 exceeds the second upper bound threshold that is lower than the first upper bound threshold. Accordingly, EVDO communication throughput can be improved efficiently while securing 1x paging capturing capability.

Second Embodiment

Figure 5:
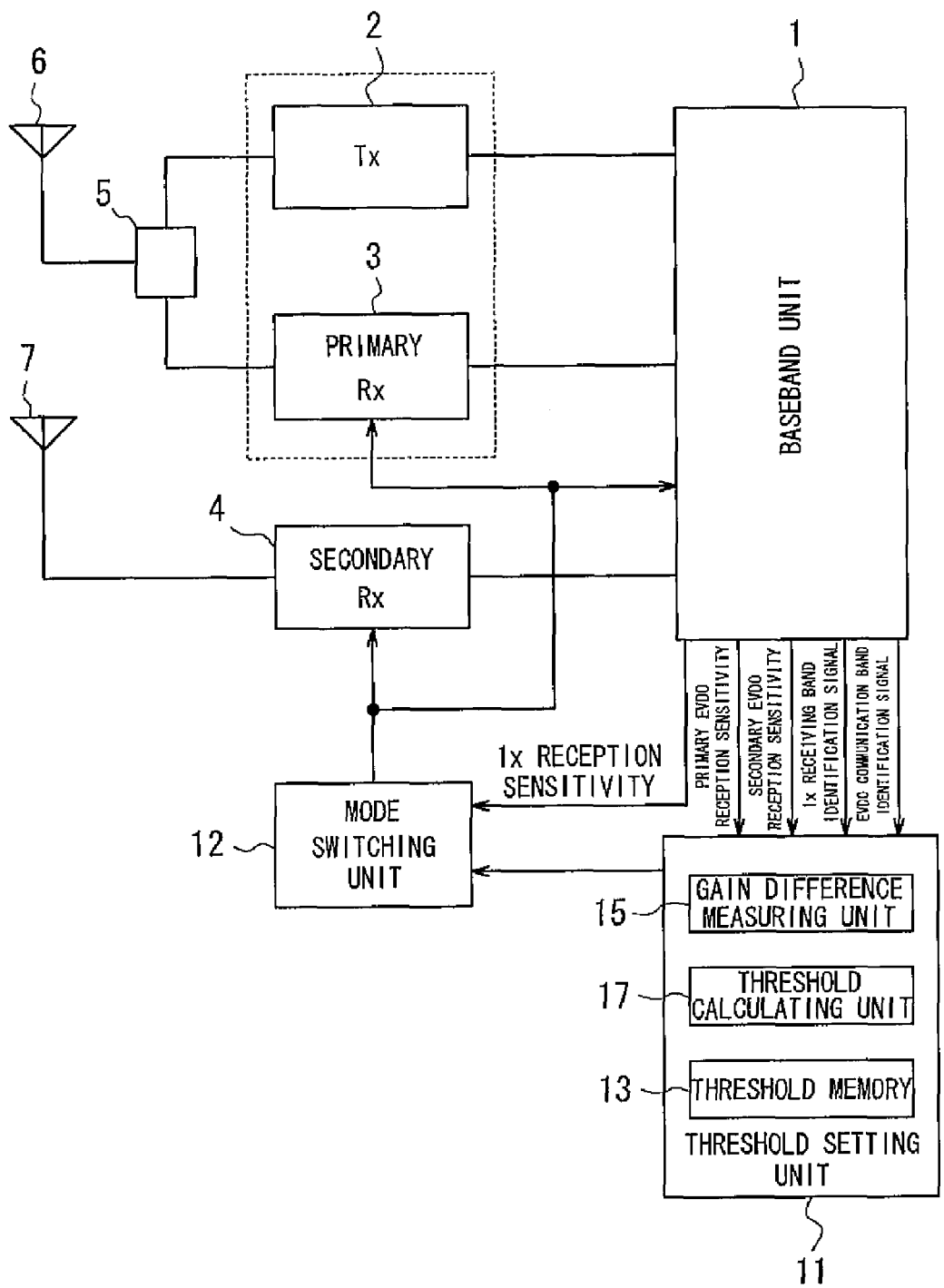
FIG. 5 is a block diagram showing a schematic configuration of a cellular phone terminal according to a second embodiment of the present invention.

FIG. 5 is a functional block diagram showing a schematic configuration of a cellular phone terminal according to a second embodiment of the present invention.

In the present embodiment, for EVDO communication immediately following power activation of the cellular phone terminal, thresholds (in this case, a first fixed value (for the 800 MHz band) and a second fixed value (for the 2 GHz band)) set in advance for each terminal are used in a similar manner as in the first embodiment as a first upper bound threshold (for the 800 MHz band) and a second upper bound threshold (for the 2 GHz band) for switching from the hybrid mode to the SHDR mode. However, subsequently, a gain difference between a transmitting/receiving unit including a primary antenna 6 and a receiving unit including a secondary antenna 7 is measured based on an actual reception sensitivity of a primary receiving unit 3 and a secondary receiving unit 4 of EVDO communication diversity reception, and in accordance with the gain difference, a first calculated value (for the 800 MHz band) as the first upper bound threshold or a second calculated value (for the 2 GHz band) as the second upper bound threshold is calculated, whereby operating modes are switched using the calculated first calculated value or second calculated value.

Therefore, as shown in FIG. 5, an actual primary EVDO reception sensitivity and secondary EVDO reception sensitivity which are diversity-received by the primary receiving unit 3 and the secondary receiving unit 4 during EVDO communication, as well as an EVDO communication band identification signal, is supplied to the threshold setting unit 11 from the baseband unit 1. In addition, the threshold setting unit 11 is provided with: a gain difference measuring unit 15 that measures a gain difference between the transmitting/receiving unit including the primary antenna 6 and the receiving unit including the secondary antenna 7 based on the primary EVDO reception sensitivity and the secondary EVDO reception sensitivity inputted from the baseband unit 1; and a threshold calculating unit 17 that calculates a first calculated value as the first upper bound threshold or a second calculated value as the second upper bound threshold for switching from the hybrid mode to the SHDR mode based on the measured gain difference and the EVDO communication band identification signal. Other configurations and operations are the same as the first embodiment.

Hereinafter, mode switching operations of EVDO communication in a cellular phone terminal according to the present embodiment will be described with reference to the flowchart shown in FIG. 6. First, the hybrid mode is set as the default operating mode and the respectively preset first fixed value and the second fixed value are set as the first upper bound threshold and the second upper bound threshold of the threshold memory 13 (step 21).

Next, a judgment is made on whether EVDO communication is being performed or not (step S22). If so, the gain difference measuring unit 15 of the threshold setting unit 11 measures a gain difference between the transmitting/receiving unit including the primary antenna 6 and the receiving unit including the secondary antenna 7 based on the primary EVDO reception sensitivity and the secondary EVDO reception sensitivity (step S23). Furthermore, an EVDO communication band (frequency band) is judged from an EVDO communication band identification signal from the baseband unit 1 (step S24).

At this point, if the EVDO communication band is the 800 MHz band, the first calculated value is calculated based on the gain difference calculated in step S23 and the first upper bound threshold in the threshold memory 13 is set to the calculated first calculated value in place of the first fixed value (step S25). In contrast, if the EVDO communication band is the 2 GHz band, the second calculated value is calculated based on the gain difference calculated in step S23 and the second upper bound threshold in the threshold memory 13 is set to the calculated second calculated value in place of the second fixed value (step S26). Next, a judgment is made on whether a 1x paging is to be received or not or, in other words, a judgment is made on whether a 1x search is to be executed or not (step S27), and if a 1x search is not executed, the routine transitions to step S22.

On the other hand, when it is judged in step S22 that EVDO communication is not being performed, a judgment is made on whether an out-of-service state persists or not (step S28). If so, the first upper bound threshold and the second upper bound threshold in the threshold memory 13 are respectively set to the first fixed value and the second fixed value (step S29) and the routine transitions to step S27.

When executing a 1x search in step S27, next, an operating mode of the mode switching unit 12 at that point is judged (step S30).

At this point, when the operating mode is judged to be the hybrid mode, as shown in FIG. 9(a), EVDO communication and 1x reception are performed on the primary antenna 6 side while EVDO communication diversity reception is performed on the secondary antenna 7 side (step S31) in the same manner as the first embodiment. In this case, since a 1x paging is received by the primary antenna 6 having a high antenna gain, next, a judgment is made based on a 1x receiving band identification signal from the baseband unit 1 as to whether the 1x receiving band is the 800 MHz band or the 2 GHz band (step S32). As a result, in the case of the 800 MHz band, the first upper bound threshold is set as the upper bound threshold to be supplied from the threshold memory 13 to the mode switching unit 12 (step S33), the case of the 2 GHz band, the second upper bound threshold is set as the upper bound threshold (step S34). Subsequently, the mode switching unit 12 judges whether the actual 1x reception sensitivity from the baseband unit 1 exceeds the upper bound threshold or not (step S35). If not, the routine transitions to step S22. If so, since a 1x paging is receivable by the secondary antenna 7 whose antenna gain is low, the operating mode is switched from the hybrid mode to the SHDR mode with a high throughput (step S36), and the routine transitions to step S22.

Therefore, in the present embodiment, when EVDO communication and 1x reception are performed at the same band, the first calculated value calculated in step S25 or the second calculated value calculated in step S26 is used during the EVDO communication as the 1x reception sensitivity upper bound threshold for switching from the hybrid mode to the SHDR mode. Accordingly, when EVDO communication and 1x reception are to be performed at different bands, the preset first fixed value or the preset second fixed value or the first calculated value or the second calculated value calculated during a previous EVDO communication is used as the upper bound threshold.

On the other hand, in step S30, when the operating mode is judged to be the SHDR mode, as shown in FIG. 9(b), EVDO communication is performed on the primary antenna 6 side while EVDO communication diversity reception and 1x reception are performed on the secondary antenna 7 side (step S37). In this case, since a 1x paging is received by the secondary antenna 7 having a low antenna gain, the mode switching unit 12 judges whether or not the actual 1x reception sensitivity from the baseband unit 1 is equal to or lower than the lower bound threshold or not (step S38). As a result, if the 1x reception sensitivity is not equal to or lower than the lower bound threshold, the routine transitions to step S22. Conversely, if the 1x reception sensitivity is equal to or lower than the lower bound threshold, since the capturing capability of 1x paging must be increased, the operating mode is switched from the SHDR mode to the hybrid mode (step S39). Accordingly, the routine transitions to step S22 while arranging 1x paging to be received by the primary antenna 6 having a high antenna gain.

As shown, in the present embodiment, a gain difference between the transmitting/receiving unit including the primary antenna 6 and the receiving unit including the secondary antenna 7 is measured based on an actual reception sensitivity of EVDO communication diversity reception, whereby an upper bound threshold corresponding to the EVDO communication band is calculated in accordance with the gain difference. Therefore, when EVDO communication and 1x reception are performed at the same band, an upper bound threshold of 1x reception sensitivity for switching from the hybrid mode to the SHDR mode can be appropriately set in real time in accordance with a variation in the gain difference between the primary antenna 6 and the secondary antenna 7 attributable to a change in how the cellular phone terminal is held by a user or in ambient environment. Accordingly, EVDO communication throughput can be improved even more efficiently while securing 1x paging capturing capability.

Third Embodiment

In a third embodiment of the present invention, in the cellular phone terminal shown in FIG. 5, an upper bound threshold in the EVDO communication band and an upper bound threshold in another communication band are calculated at a threshold calculating unit 17 based on a gain difference between a transmitting/receiving unit including a primary antenna 6 and a receiving unit including a secondary antenna 7 measured by a gain difference measuring unit 15 of a threshold setting unit 11, and a first upper bound threshold and a second upper bound threshold are respectively set.

In other words, when the gain difference between the primary antenna 6 and the secondary antenna 7 at the EVDO communication band (for example, the 800 MHz band) varies according to a change in how the cellular phone terminal is held by a user or in ambient environment, a gain difference between the primary antenna 6 and the secondary antenna 7 at another communication band (for example, the 2 GHz band) also varies. The gain difference at the other band can be predicted through calculation based on the gain difference at the EVDO communication band measured by the gain difference measuring unit 15 and on a relative gain difference of the primary antenna 6 and the secondary antenna 7 shown in FIG. 10(b), and in turn, an upper bound threshold corresponding to the other band can be calculated from the predicted gain difference.

Figure 7:
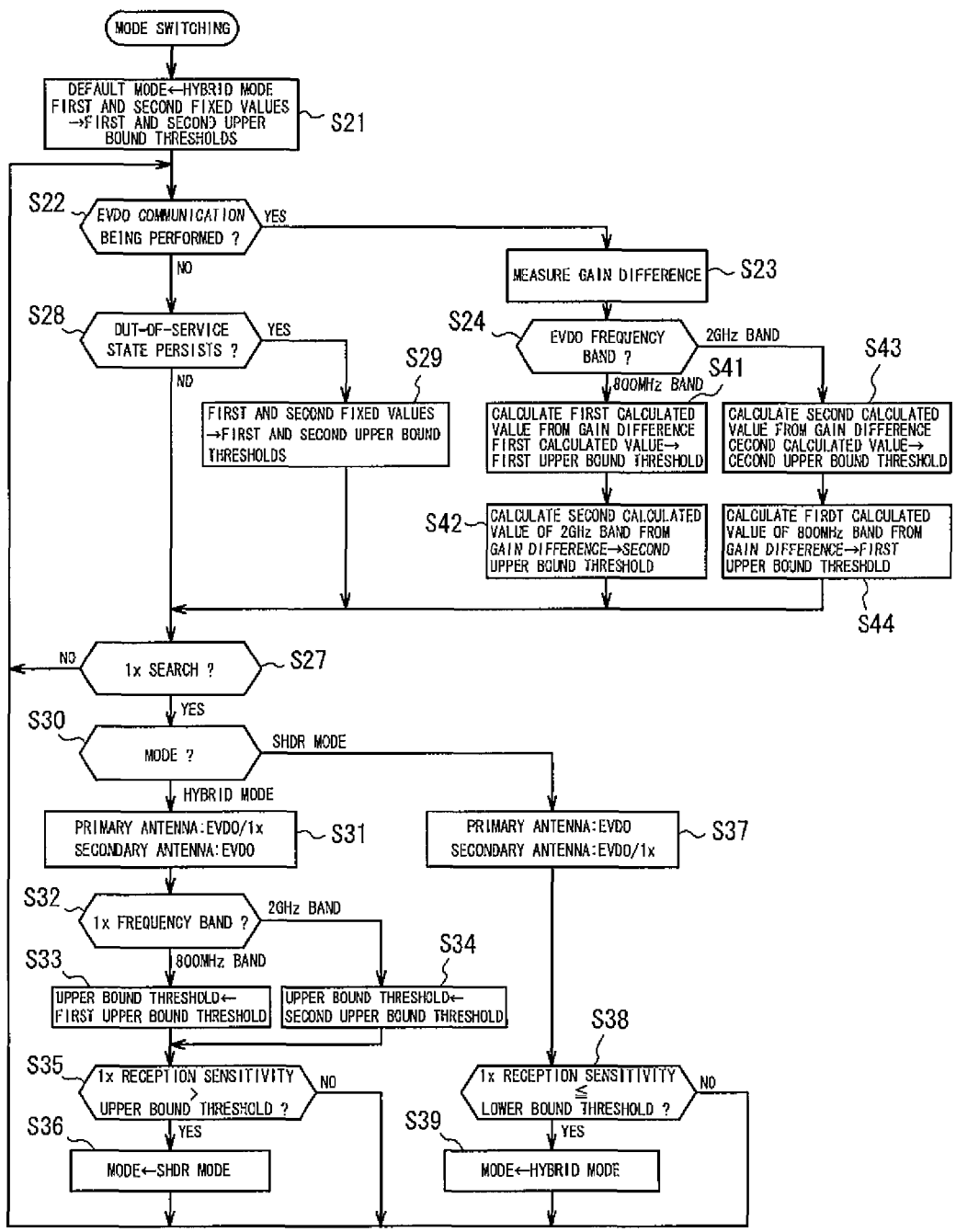
FIG. 7 is a flowchart describing a mode switching operation of EVDO communication by a cellular phone terminal according to a third embodiment of the present invention.

Therefore, in the present embodiment, as described in the flowchart shown in FIG. 7, in step S23, a gain difference between the transmitting/receiving unit including the primary antenna 6 and the receiving unit including the secondary antenna 7 is measured based on a primary EVDO reception sensitivity and a secondary EVDO reception sensitivity, and in step S24, when an EVDO communication band (frequency band) is judged from an EVDO communication band identification signal from the baseband unit 1, an upper bound threshold corresponding to the EVDO communication band and an upper bound threshold corresponding to another communication band are calculated based on the judgment result.

In other words, in step S24, if it is judged that the EVDO communication band is the 800 MHz band, the first calculated value is calculated based on the gain difference calculated in step S23 and the first upper bound threshold in the threshold memory 13 is set to the calculated first calculated value in place of the first fixed value (step S41). Furthermore, the second calculated value corresponding to the 2 GHz band is calculated based on the gain difference calculated in step S23 and an inherent relative gain difference between the primary antenna 6 and the secondary antenna 7, and the second upper bound threshold in the threshold memory 13 is set to the calculated second calculated value in place of the second fixed value (step S42).

Similarly, in step S24, if it is judged that the EVDO communication band is the 2 GHz band, the second calculated value is calculated based on the gain difference calculated in step S23, and the second upper bound threshold in the threshold memory 13 is set to the calculated second calculated value in place of the second fixed value (step S43). Furthermore, the first calculated value corresponding to the 800 MHz band is calculated based on the gain difference calculated in step S23 and an inherent relative gain difference between the primary antenna 6 and the secondary antenna 7, and the first upper bound threshold in the threshold memory 13 is set to the calculated first calculated value in place of the first fixed value (step S44).

Figure 6:
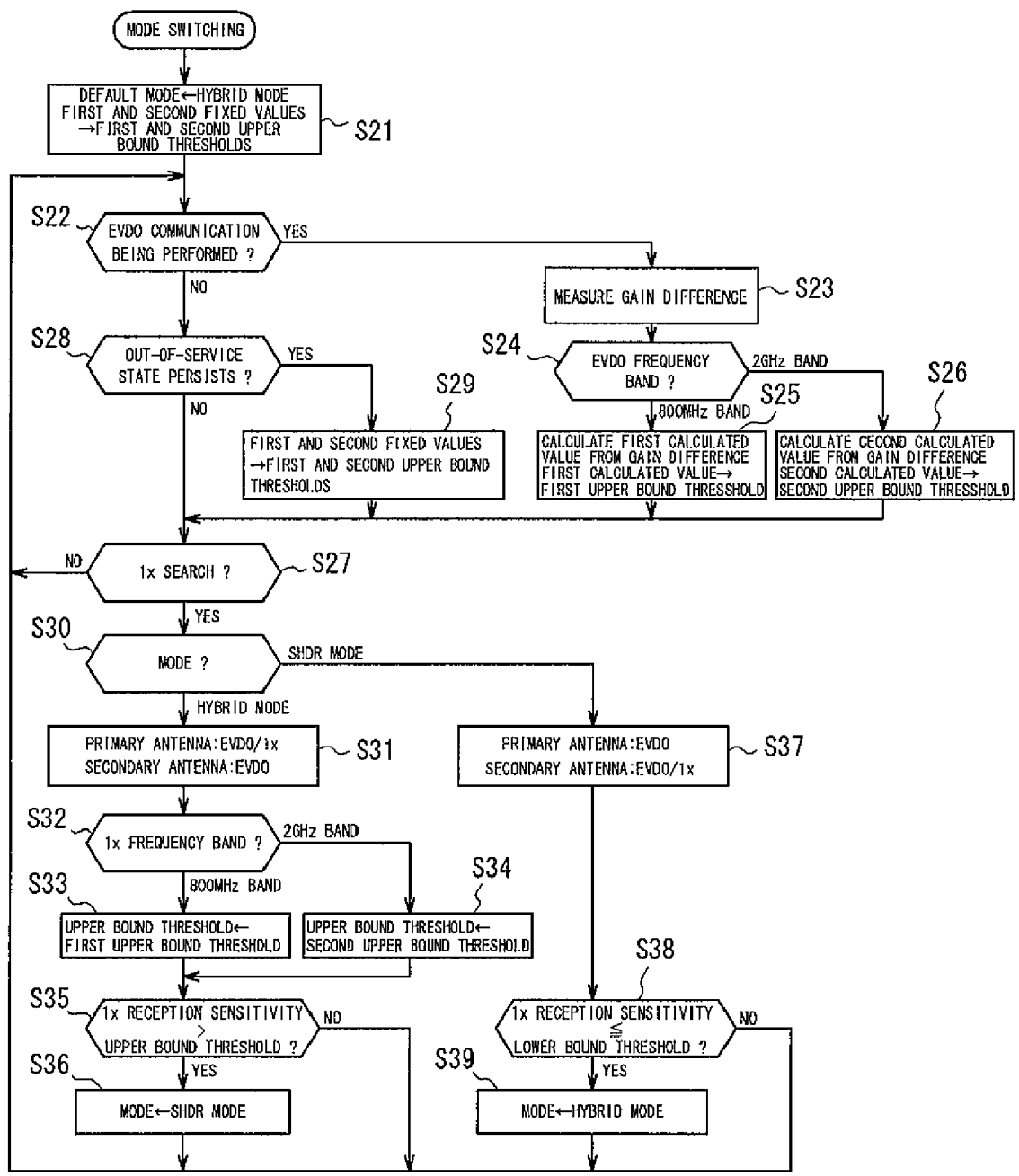
FIG. 6 is a flowchart describing a mode switching operation of EVDO communication according to the second embodiment.

In this manner, similar to the case shown in FIG. 6, when the 1x receiving band is judged to be the 800 MHz band in step S32, the first upper bound threshold is set as the upper bound threshold to be supplied from the threshold memory 13 to the mode switching unit 12 (step S33), and when the 1x receiving band is judged to be the 2 GHz band, the second upper bound threshold is set as the upper bound threshold (step S34). In FIG. 7, steps for performing the same processing as in FIG. 6 are assigned the same step characters and descriptions thereof will be omitted.

Therefore, according to the present invention, as well as when EVDO communication and 1x reception are performed at the same band, even when EVDO communication and 1x reception are performed at different bands, an upper bound threshold of 1x reception sensitivity for switching from the hybrid mode to the SHDR mode can be appropriately set in real time in accordance with a variation in the gain difference between the primary antenna 6 and the secondary antenna 7 attributable to changes in how the cellular phone terminal is held by a user or in ambient environment. Accordingly, EVDO communication throughput can be improved even more efficiently while securing 1x paging capturing capability.

Moreover, the present invention is not limited to the embodiment described above, and various changes and modifications may be made thereto. For example, in the third embodiment, after the first calculated value is calculated in step S41 shown in FIG. 7, in step S42, a value lowered from the first calculated value by a predetermined sensitivity can also be uniquely calculated as the second calculated value. Similarly, after the second calculated value is calculated in step S43, in step S44, a value raised from the second calculated value by a predetermined sensitivity can also be uniquely calculated as the first calculated value.

Furthermore, the present invention is not limited to 1x and 1xEVDO under the cdma 2000 system using the 800 MHz band and the 2 GHz band, and can also be effectively applied to a wireless communication apparatus having a transmitting/receiving unit capable of transmitting/receiving information through two different wireless communication systems and a receiving unit capable of receiving information through the two different wireless communication systems and which switches between operating modes in a similar manner.

The invention claimed is:

1. A wireless communication method comprising:
using a transmitting/receiving unit capable of transmitting/receiving information through a first wireless communication system and a second wireless communication system; and a receiving unit capable of receiving information through the first wireless communication system and the second wireless communication system and whose reception gain in the first wireless communication system is smaller than the transmitting/receiving unit and,
switching reception of the first wireless communication system from the transmitting/receiving unit to the receiving unit when information is being transmitted/received by the transmitting/receiving unit through the second wireless communication system based on a reception sensitivity of the first wireless communication system through the transmitting/receiving unit and a first threshold or a second threshold, the first and second thresholds are set in accordance with a reception gain difference in a receiving band between the transmitting/receiving unit and the receiving unit.

2. A wireless communication apparatus comprising:
a transmitting/receiving unit capable of transmitting/receiving information through a first wireless communication system and a second wireless communication system;
a receiving unit capable of receiving information through the first wireless communication system and the second wireless communication system and whose reception gain in the first wireless communication system is smaller than the transmitting/receiving unit;
a switching unit which switches reception of the first wireless communication system from the transmitting/receiving unit to the receiving unit when information is being transmitted/received by the transmitting/receiving unit through the second wireless communication system based on a reception sensitivity of the first wireless communication system through the transmitting/receiving unit and a threshold; and
a threshold setting unit that sets the threshold in accordance with a reception gain difference in a receiving band between the transmitting/receiving unit and the receiving unit to a first threshold when the reception gain difference is large and to a second threshold when the reception gain difference is small.

3. The wireless communication apparatus according to claim 2, characterized in that the second threshold is smaller than the first threshold.

4. The wireless communication apparatus according to claim 2, characterized in that
the receiving unit carries out diversity reception on information through the second wireless communication system when information is being transmitted/received by the transmitting/receiving unit through the second wireless communication system, and
the threshold setting unit sets the first threshold or the second threshold in accordance with a reception gain difference between the transmitting/receiving unit and the receiving unit through the second wireless communication system.

5. The wireless communication apparatus according to claim 3, characterized in that
the receiving unit carries out diversity reception on information through the second wireless communication system when information is being transmitted/received by the transmitting/receiving unit through the second wireless communication system, and
the threshold setting unit sets the first threshold or the second threshold in accordance with a reception gain difference between the transmitting/receiving unit and the receiving unit through the second wireless communication system.

6. A wireless communication apparatus comprising:
a transmitting/receiving unit capable of transmitting/receiving information through a first wireless communication system and a second wireless communication system;
a receiving unit capable of receiving information through the first wireless communication system and the second wireless communication system and whose reception gain in the first wireless communication system is smaller than the transmitting/receiving unit;

a switching unit which switches reception of the first wireless communication system from the transmitting/receiving unit to the receiving unit when information is being transmitted/received by the transmitting/receiving unit through the second wireless communication system based on a reception sensitivity of the first wireless communication system through the transmitting/receiving unit and a threshold; and a threshold setting unit that sets the threshold to a first threshold when the frequency used by the first wireless communication system and received by the transmitting/receiving unit is at a first frequency band and to a second threshold when the frequency is at a second frequency band.

7. The wireless communication apparatus according to claim 6, characterized in that the second threshold is smaller than the first threshold.

* * * * *